United States Patent
Kurek et al.

(10) Patent No.: US 12,162,791 B2
(45) Date of Patent: Dec. 10, 2024

(54) METHOD FOR PRODUCING GLASS SHEETS AND GLASS SHEETS PRODUCED BY SUCH METHOD AND USE THEREOF

(71) Applicant: SCHOTT AG, Mainz (DE)

(72) Inventors: Klaus-Peter Kurek, Mainz (DE); Martin Kurz, Kronberg (DE); Andreas Ortner, Gau-Algesheim (DE); Olaf Claussen, Undenheim (DE)

(73) Assignee: SCHOTT AG, Mainz (DE)

( * ) Notice: Subject to any disclaimer, the term of this patent is extended or adjusted under 35 U.S.C. 154(b) by 1001 days.

(21) Appl. No.: 17/083,167

(22) Filed: Oct. 28, 2020

(65) Prior Publication Data

US 2021/0179474 A1  Jun. 17, 2021

(30) Foreign Application Priority Data

Oct. 28, 2019 (DE) ..................... 10 2019 129 036.8

(51) Int. Cl.

| | |
|---|---|
| C03B 33/02 | (2006.01) |
| C03B 17/06 | (2006.01) |
| C03B 25/00 | (2006.01) |
| C03B 25/02 | (2006.01) |
| C03B 33/023 | (2006.01) |

(52) U.S. Cl.
CPC ........ *C03B 33/0222* (2013.01); *C03B 25/025* (2013.01); *C03B 33/0235* (2013.01)

(58) Field of Classification Search
None
See application file for complete search history.

(56) References Cited

U.S. PATENT DOCUMENTS

| | | |
|---|---|---|
| 3,840,360 A | 10/1974 | Wright |
| 4,891,054 A | 1/1990 | Bricker |
| 6,252,197 B1 * | 6/2001 | Hoekstra .............. B23K 26/53 |
| | | 219/121.72 |

(Continued)

FOREIGN PATENT DOCUMENTS

| | | |
|---|---|---|
| CN | 101229953 | 7/2008 |
| DE | 102015104802 | 9/2016 |

(Continued)

OTHER PUBLICATIONS

AF32 Schott SDS (Year: 2018).*

*Primary Examiner* — Jodi C Franklin
(74) *Attorney, Agent, or Firm* — Ruggiero McAllister & McMahon LLC

(57) ABSTRACT

A method for producing ultra-thin glass sheets is provided that results in glass sheets with high edge strength. The method includes: hot forming a continuous glass ribbon with a glass thickness from molten glass; annealing the glass ribbon with an annealing rate chosen based on the glass thickness; producing a laser beam focus area that is longer than the glass thickness; introducing filamentary defects into the glass ribbon using the laser beam so that the filamentary defects extend from one face to the opposite face and are spaced apart from one another along the breaking lines to produce transverse breaking lines and longitudinal breaking lines with margins each comprising a thickened bead; separating the beads along the longitudinal breaking lines and separating glass sheets by severing along the transverse breaking lines.

17 Claims, 7 Drawing Sheets

(56) References Cited

U.S. PATENT DOCUMENTS

| | | | | |
|---|---|---|---|---|
| 6,502,423 B1* | 1/2003 | Ostendarp | C03B 17/068 | 65/176 |
| 7,396,741 B2* | 7/2008 | Mund | C03C 17/02 | 257/730 |
| 7,982,162 B2* | 7/2011 | Abramov | B23K 26/0876 | 219/121.72 |
| 8,136,371 B2* | 3/2012 | Kato | C03B 25/025 | 65/95 |
| 8,867,191 B2* | 10/2014 | Letz | C03B 17/06 | 361/321.5 |
| 9,428,359 B2* | 8/2016 | Garner | B65H 18/103 | |
| 10,494,289 B2* | 12/2019 | Booth | C03B 33/033 | |
| 11,155,496 B2* | 10/2021 | Lotze | C03C 21/002 | |
| 2002/0006765 A1* | 1/2002 | Michel | B23K 26/53 | 451/28 |
| 2003/0029199 A1* | 2/2003 | Pitbladdo | C03B 17/067 | 65/195 |
| 2007/0191207 A1* | 8/2007 | Danielson | C03C 3/095 | 501/72 |
| 2009/0226733 A1* | 9/2009 | Kato | C03B 17/067 | 65/95 |
| 2011/0317329 A1* | 12/2011 | Letz | C03C 3/091 | 361/321.5 |
| 2012/0000894 A1* | 1/2012 | Abramov | B23K 26/0869 | 219/121.72 |
| 2012/0125967 A1* | 5/2012 | Furuta | C03B 33/0235 | 225/3 |
| 2013/0126576 A1* | 5/2013 | Marshall | C03B 33/0235 | 225/2 |
| 2013/0129987 A1* | 5/2013 | Mitsugi | C03B 17/06 | 428/192 |
| 2014/0137602 A1* | 5/2014 | Tamamura | C03B 17/06 | 65/94 |
| 2015/0076203 A1* | 3/2015 | Mishina | B28D 5/0052 | 225/96 |
| 2015/0166391 A1* | 6/2015 | Marjanovic | B23K 26/0624 | 428/192 |
| 2015/0166394 A1* | 6/2015 | Marjanovic | B23K 26/0884 | 428/192 |
| 2015/0232369 A1* | 8/2015 | Marjanovic | B23K 26/0622 | 428/221 |
| 2016/0031745 A1* | 2/2016 | Ortner | B23K 26/53 | 65/157 |
| 2016/0168003 A1* | 6/2016 | Hasegawa | C03B 33/0235 | 65/184 |
| 2016/0272456 A1* | 9/2016 | Cho | B65H 35/04 | |
| 2017/0057860 A1* | 3/2017 | Habeck | C03B 17/064 | |
| 2017/0120374 A1 | 5/2017 | Hendricks | | |
| 2018/0022631 A1* | 1/2018 | Förtsch | C03B 33/091 | 65/112 |
| 2018/0057390 A1 | 3/2018 | Hackert | | |
| 2018/0111870 A1* | 4/2018 | Herrnberger | B23K 26/046 | |
| 2018/0186678 A1* | 7/2018 | Boeker | C03B 33/093 | |
| 2018/0194669 A1* | 7/2018 | Ding | C03C 4/18 | |
| 2018/0244566 A1* | 8/2018 | Hamilton | C03C 17/002 | |
| 2019/0010074 A1* | 1/2019 | Chen | C03B 17/064 | |
| 2019/0047894 A1* | 2/2019 | Heiss | C03B 33/091 | |
| 2019/0062200 A1* | 2/2019 | He | C03C 3/078 | |
| 2019/0283178 A1 | 9/2019 | Mishchik | | |
| 2019/0322564 A1 | 10/2019 | Wagner | | |
| 2019/0382300 A1* | 12/2019 | Bui | B23K 26/032 | |

FOREIGN PATENT DOCUMENTS

| | | |
|---|---|---|
| DE | 102017100015 | 7/2018 |
| EP | 2990172 | 8/2014 |
| WO | 2017025550 | 2/2017 |
| WO | 2017055576 | 4/2017 |
| WO | 2018020145 | 2/2018 |

* cited by examiner

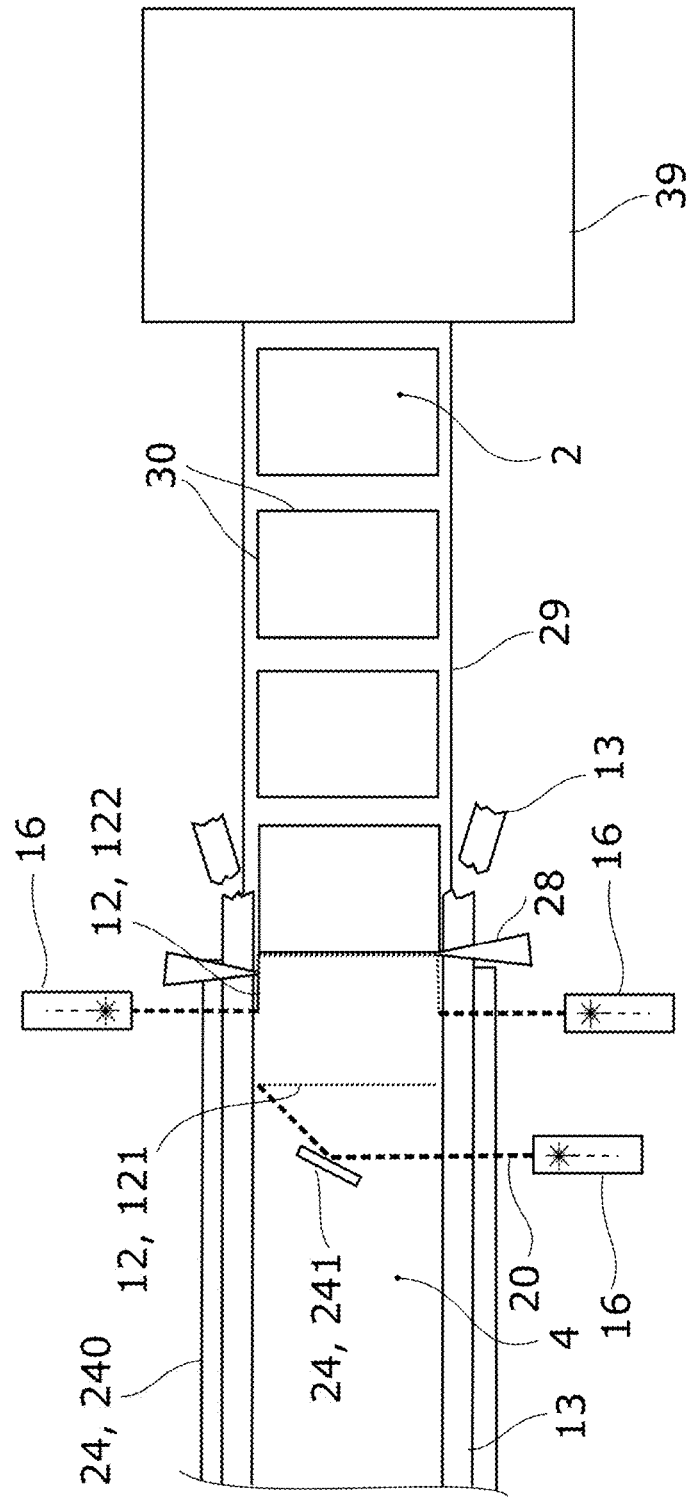

METHOD FOR PRODUCING GLASS SHEETS AND GLASS SHEETS PRODUCED BY SUCH METHOD AND USE THEREOF

CROSS REFERENCE TO RELATED APPLICATIONS

This application claims the benefit of German Application 10 2019 129 036.8 filed Oct. 28, 2019, the entire contents of which are incorporated herein by reference.

BACKGROUND

1. Field of the Invention

The present invention relates to methods for producing ultra-thin glass sheets and as glass films, namely glasses with a glass thickness of 15 µm to 2 mm. The methods include laser filamentation for introducing predetermined breaking lines into glass ribbons and subsequent separation of the process-related thickened beads, that is the bead-like thickenings along either edge in the longitudinal direction of the glass ribbon, as well as the separation of the glass sheets in the transverse direction of the glass ribbon.

2. Description of Related Art

Laser filamentation for severing beads and for transverse separation of the glass ribbon and optionally in combination with later separation of the glass allows for higher glass ribbon advancing rates or drawing rates as well as cutting rates in the cutting process than wheel cutting, for example, in which the achievable cutting rates for beads and cross scoring are in particular limited by the separation and deposition processes a worker has to perform. Furthermore, laser filamentation is a low-particle process, which translates into less contamination and scratches in the glass.

The separation of glass sheets by introducing filaments using ultra-short pulsed lasers is known per se. Corresponding methods have been described in WO 2018/020145 A1, WO 2017/055576 A1, US 2018/0057390 A1, and US 2017/0120374 A1, inter alia.

Since compliance with specific geometry factors requires specific minimum drawing rates for ultra-thin glasses because of warpage and thickness variations, etc., considerable annealing rates are resulting at high drawing rates. The high annealing rates usually lead to internal stresses in the glass, which results in reduced edge strength when cutting the glass, so that high annealing rates are usually disadvantageous.

SUMMARY

The invention is therefore based on the object of providing a particularly cost-effective method for producing ultra-thin glass sheets, which guarantees high edge strength of the glass sheets produced by this method, while taking into account different annealing rates, in particular despite high annealing rates. This object is achieved by the subject matter of the independent claims. Advantageous embodiments of the invention are specified in the respective dependent claims.

Therefore, the invention provides a method for producing glass sheets, which comprises the steps of: hot forming a continuous glass ribbon with a predefined glass thickness in a range from 15 µm to 2 mm from a molten glass; annealing the glass ribbon with an annealing rate that is chosen as a function of the predefined glass thickness, the annealing rate preferably being increased as the glass thickness decreases, that is, preferably the annealing rate being chosen higher the lower the glass thickness is; generating a laser beam by at least one ultra-short pulsed laser; producing a focus area of the laser beam using beam-shaping optics such that the focus area is longer than the glass thickness of the glass ribbon; introducing predetermined breaking lines consisting of filamentary defects into the glass ribbon using the laser beam in such a manner that the filamentary defects preferably extend from one face to the opposite face of the glass ribbon, and wherein the filamentary defects are introduced spaced apart from one another along the predetermined breaking lines, thereby producing transverse predetermined breaking lines perpendicular to the glass ribbon and longitudinal predetermined breaking lines longitudinally of the glass ribbon on either side thereof, with margins each comprising a thickened bead; separating the beads along the longitudinal predetermined breaking lines thereby forming edges that preferably have a predetermined edge strength; and separating glass sheets by severing along the transverse predetermined breaking lines that extend perpendicular to the glass ribbon thereby forming edges that preferably have a predetermined edge strength.

The laser beam can be shaped by the beam-shaping optics in particular so as to form a Bessel beam.

The corresponding apparatus for producing glass sheets according to the aforementioned method preferably comprises means for hot forming a continuous glass ribbon with a predefined glass thickness in a range from 15 µm to 2 mm from a molten glass; at least one ultra-short pulsed laser and beam-shaping optics generating a Bessel beam with a beam profile that produces a focus area that is adjusted so as to be longer than the thickness of the glass for producing spaced apart filamentary defects extending into the depth in a predefined volume of the glass ribbon to define transverse predetermined breaking lines perpendicular to the glass ribbon and to define longitudinal predetermined breaking lines longitudinally of the glass ribbon on either side thereof, with margins each including a thickened bead; advancing means for positioning the laser beam along an intended path of the predetermined breaking lines on the glass ribbon; and annealing means arranged and adapted for annealing the glass ribbon prior to, during, and/or after the introducing of the filamentary defects into the glass ribbon at an annealing rate that is selected as a function of the predefined glass thickness, said annealing rate preferably being higher the lower the glass thickness is. Furthermore, separating means may be provided, arranged and adapted for separating the beads along the longitudinal predetermined breaking lines and for separating the glass sheets by severing along the transverse predetermined breaking lines extending perpendicular to the glass ribbon, thereby forming edges in each case, preferably mechanically.

The positioning of the laser beam by the advancing means may be achieved by at least one of the steps: moving the glass ribbon; moving the at least one ultra-short pulsed laser; moving or adjusting the beam-shaping optics.

The preferred glass thickness is equal to or less than 100 µm, less than 70 µm, equal to or less than 50 µm, equal to or less than 30 µm, or less than 20 µm.

The glass ribbon is preferably rapidly drawn in a down-drawing process, preferably at a rate ranging from 1 meter per minute to 50 meters per minute. However, the method is not limited to the down-drawing process. Drawing can also be accomplished by an overflow fusion process or other processes that are suitable for producing thin glass ribbons.

The introducing of the predetermined breaking lines made up of filamentary defects is preferably performed during the down-drawing process, according to one embodiment after the glass ribbon has been deflected into the horizontal.

The glass ribbon is preferably annealed rapidly; in particular annealing rates of equal to or greater than 40 K/s can be employed. The annealing rates may in particular even be significantly higher, preferably equal to or greater than 100 K/s, most preferably equal to or greater than 150 K/s, or even equal to or greater than 200 K/s.

According to one embodiment of the invention, the glass ribbon is annealed at a thickness-dependent annealing rate, preferably at an annealing rate which ranges from (1/d)·4500 Kelvin/(s·μm) to (1/d)·9000 Kelvin/(s·μm), where d is the thickness of the glass ribbon. Thus, preferably, for a predefined smaller thickness of the glass ribbon, the annealing rate is chosen higher, and for a predefined greater thickness of the glass ribbon, the annealing rate is reduced/decreased.

In order to provide for subsequent reliable and easy separability of the margins from the glass ribbon and the separation of individual glass sheets, the glass ribbon is preferably annealed before introducing the predetermined breaking lines at about the glass transition temperature, preferably at a temperature below the softening point, most preferably at a temperature below the glass transition temperature. Optionally, for optimizing the method, the glass ribbon may additionally be annealed during and/or after the introducing of the predetermined breaking lines.

In a preferred embodiment of the method, the annealing is performed in a lehr, in particular using heating elements, or by blowing or spraying an annealing fluid, in particular air, other gaseous media, or an aerosol. In the latter case, the annealing rate can be controlled or adapted to the process parameters of glass ribbon temperature and advancement rate by controlling the flow rate of the annealing fluid, for example, in order to prevent undesirable stresses in the glass ribbon.

According to a particularly preferred aspect, the intensity distribution in the glass and thus also the shape of the filamentary defects is selectively adjusted using the beam-shaping optics. For this purpose, appropriate beam-shaping optics are preferably used to adjust the beam profile such that the light intensity of the laser beam, or its dimension, is greater in the direction of the predetermined breaking lines than transversely thereto.

In a further preferred embodiment of the method, the beam-shaping optics are used to produce a beam profile having a preferred lateral direction, preferably any of an elliptical, lancet-shaped, drop-shaped beam profile, or a beam profile comprising two spaced-apart beams (e.g. in the form of a double Bessel beam), or a diamond-shaped, dumbbell-shaped, wedge-shaped, or spot-shaped beam profile, or else a beam profile comprising a main beam and a satellite of lower intensity. In this way, almost any contour can be achieved after severing the margins and separating the glass sheets, with particularly high edge quality and edge strength.

The advancement rate and the repetition rate of the ultra-short pulsed laser are preferably set such that the filamentary defects are introduced spaced apart from one another with a spacing that is not greater than the glass thickness. The filamentary defects preferably have a mean spacing to one another ranging from 1 μm to 10 μm, preferably from 3 μm to 8 μm.

In a preferred embodiment of the method for producing glass sheets, the order in which the predetermined breaking lines are introduced is first transversely to the glass ribbon, thereby producing the transverse predetermined breaking lines, and then longitudinally of the glass ribbon on either side thereof, with margins each including a thickened bead, in order to produce the longitudinal predetermined breaking lines. In this way, the glass ribbon will still be held together by the beads after the transverse predetermined breaking lines have been introduced, and will thereby be stabilized mechanically.

Furthermore, it was found that for thinner glasses implying a higher annealing rate, the edge strength decreases, and that, conversely, for thicker glasses with lower annealing rate, the edge strength increases. In a preferred embodiment of the method, the glass sheets are produced with edges that exhibit an annealing-dependent edge strength $KG_K$, which satisfy the following formula:

$$KG_K = KG/K, \text{ or} \qquad (1)$$

$$KG = KG_K * K. \qquad (2)$$

Here, $K_G$ denotes a strength value, in MPa, and K is the annealing rate, in Kelvin/s. The separation method disclosed herein in particular allows to achieve a coefficient $KG_K$ which is greater than 0.2 MPa*s/Kelvin, preferably greater than 0.5 MPa*s/Kelvin for a glass thickness of at least 30 μm. For a glass thickness of at least 50 μm, the annealing-dependent edge strength $KG_K$ can be greater than 0.5 MPa·s/Kelvin, preferably greater than 0.9 MPa·s/Kelvin. For a glass thickness of at least 100 μm, according to another embodiment, the annealing-dependent edge strength $KG_K$ is greater than 1.5 MPa·s/Kelvin, preferably greater than 2 MPa·s/Kelvin.

In a further preferred embodiment, the advancing means for moving the glass ribbon preferably comprise at least a pressure roller, or a pressure edge, or suction means for fixing the position of the glass ribbon within the focus area. Thereby, the glass ribbon is fixed relative to the position of the focus of the ultra-short pulsed laser and with respect to the array of the predetermined breaking points made up of filamentary defects, so that the glass ribbon is prevented from moving out of the area of the focus of the Bessel beam.

The fixing in particular furthermore allows to increase the speed of the manufacturing process while avoiding the disadvantages described above, which has a positive impact on the economy of the method.

The separating of the beads along the longitudinal predetermined breaking lines and the separating of glass sheets by severing along the transverse predetermined breaking lines that extend perpendicular to the glass ribbon is preferably accomplished mechanically. It has been found that the separation along the predetermined breaking line usually hardly requires any mechanical impact.

Often the movements and tensions arising during the conveying of the glass ribbon are already sufficient for separation at the predetermined breaking point.

The method for producing ultra-thin glass sheets according to the present disclosure moreover permits to achieve particularly high cutting rates of in particular up to 5 m/s, most preferably 3 m/s to 5 m/s.

Thanks to the laser filamentation, only very small or no separation forces on the glass ribbon are required for the beads cut and for transverse separation, i.e. for the separation of the beads and separation into individual glass sheets or what is known as a full body cut (FBC), as mentioned before. In particular, there is no need to induce by introducing a temperature, that is, induce thermal stresses by introducing a temperature differential, i.e., for example, no so-called thermal cleaving process and no thermal shock cutting as caused by an abrupt temperature decrease, in particular due to a cold shock.

The method according to the present disclosure permits to achieve high edge strengths with different annealing rates, in particular even with high annealing rates, by taking into account the glass thickness.

The thickness-dependent annealing rate is therefore not a drawback, but rather is part of the solution to the objective.

The method is a particularly low-particle process and results in a particularly consistent edge strength and thus increased predictable yields.

Furthermore, the method is particularly cost-effective, due to the reduced production costs and the consistent quality of the glass sheets achieved by the method.

The method can be used to produce glass sheets with a glass thickness from 15 μm to 2 mm, preferably with a glass thickness of equal to or less than 100 μm, 50 μm, or 30 μm, preferably with a thermal expansion coefficient of greater than 6 ppm/K, and the glass sheet preferably has a Weibull modulus (according to DIN EN 843-5) of greater than 7 and a characteristic breaking stress or stress at break of more than 130 MPa, often even more than 150 MPa, or even more than 200 MPa. In a preferred embodiment, the characteristic stress at break is in a range from 150 MPa to 250 MPa. For the 5% quantile for an edge length of 1.68 meters, $\sigma_{5\%@1,68}$, values of more than 90 MPa, often even more than 130 MPa, are resulting.

The glass sheets preferably have rough surface areas with filamentary defects and, therebetween, flat surface areas without filamentary defects, with an area ratio of the flat surface areas to the rough surface areas of preferably between 3:10 and 2:1.

Such ultra-thin glass sheets that are producible by the method according to the invention can be used for very diverse applications. They are preferably employed for insulating intermediate substrates or spacers for electronic components, for encapsulating optoelectronic components, as substrates for thin-film cells such as thin-film batteries or thin-film solar cells, as composite substrates for displays, and for microfluidic cells.

The diverse applications are based on properties such as resistance to chemicals, temperature changes and heat, gas tightness, high electrical insulation capacity, matched expansion coefficients, flexibility, high optical quality, and light transmittance, and also the high surface quality with very little roughness of the two faces of the thin glass, and the high edge strength achieved by the separating method.

The invention will now be explained in more detail with reference to and by way of the enclosed figures, although without thereby limiting the invention.

BRIEF DESCRIPTION OF THE FIGURES

FIG. 3 shows an arrangement for separating the glass ribbon into individual glass sheets;

DETAILED DESCRIPTION

Figure 1:
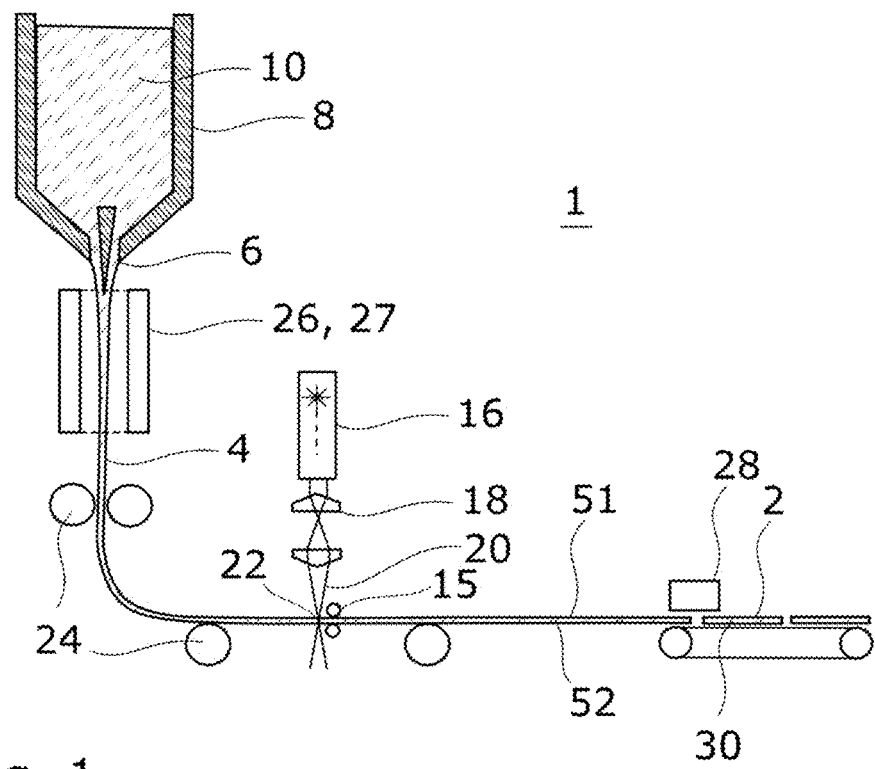
FIG. 1 shows an apparatus for producing glass sheets.

FIG. 1 shows an exemplary embodiment of an apparatus 1 for producing glass sheets 2 that have a predefined glass thickness d in a range from 15 μm to 2 mm. A continuous glass ribbon 4 is drawn from a molten glass 10 through a downwardly directed slot-shaped nozzle 6 which forms part of hot forming means 8. Preferably, the so-called down-drawing process is employed as the hot-forming process for glass ribbons here, and the introducing of predetermined breaking lines 12 defined by filamentary defects 14, i.e. laser filamentation, is preferably accomplished directly during the down-drawing process, most preferably after the glass ribbon 4 has been deflected to the horizontal.

At least one ultra-short pulsed laser 16 is used to introduce controlled predetermined breaking lines 12 into the glass ribbon 4, which are defined by filamentary defects 14. With beam-shaping optics 18, the laser pulse forms an approximate Bessel beam 20 which produces a focus area 22 that intersects the glass ribbon 4. The beam-shaping optics 18 can in particular focus the laser beam 20 so as to increase power density in the glass. The beam-shaping optics 18 allow to selectively adjust the intensity distribution and thus also the shape of the filamentary defects 14.

The focal area is preferably adjusted so as to be longer than the glass thickness d in order to produce deep spaced apart filamentary defects 14 in a predetermined volume of the glass ribbon 4, which preferably extend from one face 51 to the opposite face 52 of the glass ribbon 4, i.e. preferably across the entire thickness d of the glass ribbon 4.

A suitable ultra-short pulsed laser for the purposes of the invention is a Nd:YAG laser, for example, with a wavelength of 1064 nm, a mean power of 12 W (@ 1064 nm, 100 kHz, 1 pulse per burst), a repetition rate of 100 kHz, a burst frequency of 50 MHz, and a pulse duration of approximately 10 ps (@ 1064 nm and 100 kHz).

According to a further embodiment, a Yb:YAG laser with 1030 nm can be used. Generally, the lasers may be used as second harmonic generation (SHG) or third harmonic generation (THG) versions. According to one embodiment, pulse lengths range from 300 fs to 20 ps, or range from 400 fs to less than 10 ps. Repetition rates may range from 50 kHz to 1 MHz, preferably from 100 kHz to 500 kHz. Pulse energies may be more than 100 μJ, more than 200 μJ, or even more than 400 μJ. The number of burst pulses is ≤2, ≤4, or ≤8.

Furthermore, the apparatus 1 for producing glass sheets 2 preferably comprises advancing means 24, for example comprising transport rollers, in particular drawing rollers, for moving the glass ribbon 4, the ultrashort laser 16, and/or the beam-shaping optics 18 for positioning the laser beam 20 along an intended path of the predetermined breaking lines 12 on the glass ribbon 4.

The laser beam 20 may be directed over the glass ribbon 4, or else the glass ribbon 4 may be conveyed past the laser beam 20. A combination of the two variants is possible as well. In order to move the laser beam 20 perpendicular to the advancement direction of the glass ribbon 4, a galvanometer scanner can be used, for example, or a deflecting mirror can be conveyed on a movable shaft perpendicular to the glass ribbon.

In the present case, transverse predetermined breaking lines 121 are defined perpendicular to the glass ribbon 4, and longitudinal predetermined breaking lines 122 are defined longitudinally of the glass ribbon 4 on either side thereof, with margins each including a thickened bead 13.

The invention is also based on the finding that the spread of the breaking force at the edges produced by the laser-assisted method according to the present disclosure can be reduced when using an annealing rate that is adapted to the glass thickness.

The apparatus 1 for producing glass sheets 2 therefore moreover comprises annealing means 26 which are arranged and adapted so as to anneal the glass ribbon 4 before the filamentary defects 14 are introduced into the glass ribbon 4, and this at an annealing rate that is chosen as a function of the predefined glass thickness d, and this annealing rate preferably is higher the lower the glass thickness is.

Preferably, the glass ribbon 4 is annealed before the predetermined breaking lines 12 are introduced at about the glass transition temperature, preferably at a temperature below the softening point, most preferably at a temperature below the glass transition temperature.

In an advantageous embodiment, the glass ribbon 4 is annealed in a lehr 27, in particular in a controlled manner using heating elements. Optionally, homogeneous annealing may be promoted by blowing or spraying an annealing fluid, in particular air or an aerosol.

According to one embodiment, the apparatus 1 for producing glass sheets 2 furthermore comprises separating means 28 arranged and adapted for separating the beads 13 along the longitudinal predetermined breaking lines 122 thereby forming edges 30, and for separating the glass sheets 2 by severing along the transverse predetermined breaking lines 121 thereby forming further edges 30, preferably mechanically. For example, the separating means may comprise an assembly including a spherical roller which is directed over the predetermined breaking lines. Also, a heating source such as a laser may be provided in order to induce thermal stresses at the predetermined breaking line. In some cases, however, mechanical action will not be required any more for separating the glass along the predetermined breaking lines.

Furthermore, the beam-shaping optics 18 allow to selectively adjust the intensity distribution in the glass and thus also the shape of the filamentary defects 14.

In a further preferred embodiment, the advancing means 24 for moving the glass ribbon 4 are equipped at least with a pressure roller, a pressure edge, or suction means for fixing the axial position or the position of the glass ribbon 4 in the beam direction within the focus area so that the glass ribbon 4 does not become misaligned with regard to the separation of the glass sheets 2 and the severing of the beads 13, which could otherwise impair the shape and edge quality of the individual glass sheets 2. The fixing furthermore in particular allows to increase the speed of the manufacturing process while avoiding the drawbacks described, which has a positive impact on the cost efficiency of the method. The example of FIG. 1 shows the means for fixing the vertical position of the glass ribbon 4 in the form of a pair of pressure rollers 15 which fix the position of the glass ribbon in the direction of incidence of the laser beam 20 close to the point of incidence of the ultra-short pulsed laser 16.

In a preferred embodiment of the method for producing glass sheets 2, the beam profile is preferably adjusted by appropriate beam-shaping optics 18 such that the intensity profile has the form of a Bessel beam or approximately the form of a Bessel beam with greatly increased intensity on the optical axis. The beam-shaping optics cause focusing on a line focus. In order to achieve such a focusing, one or more axicon(s) or a diffractive optical element (DOE) or combinations thereof with other optical elements are suitable as the beam-shaping optical elements, for example.

In particular, the beam profile is preferably adjusted in such a way that the dimension of the laser beam in the direction of the predetermined breaking lines 12 is greater than transversely, in particular perpendicular thereto. In this way, the amount of radiation integrated along the predetermined breaking line is greater than along a line running perpendicular to the predetermined breaking line and crossing the center of the beam. In other words, the beam-shaping optics preferably generate a bundle of rays with a cross-section that has a larger dimension in the direction of the linearly lined-up filamentary defects 14 than transversely to this direction; the individual filamentary defects 14 have an extent that follows the direction of propagation of the laser beam 20, i.e. with their longitudinal direction transversely, preferably perpendicular to the surface of the glass ribbon 4. For this purpose, the beam-shaping optics 18 are preferably adjustable so as to produce one larger cross-sectional dimension of the beam, and the direction of larger cross-sectional dimension is preferably controlled so as to follow the path of the linearly lined-up filamentary defects 14.

Figure 2A:
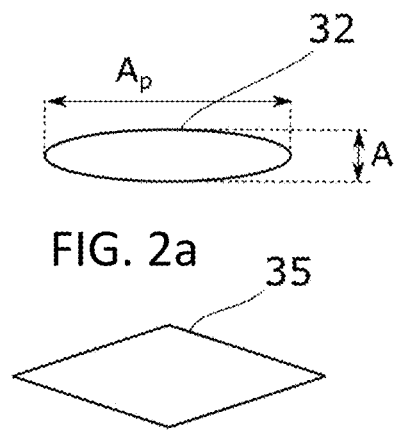
FIGS. 2a-2g show beam profiles of the beam shaping optics.
Figure 2B:
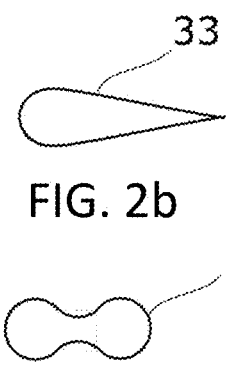
Figure 2C:
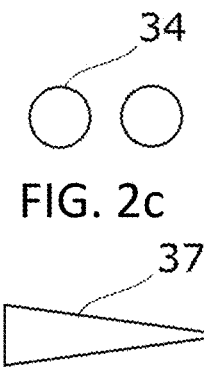
Figure 2D:
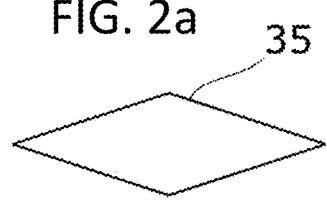
Figure 2E:
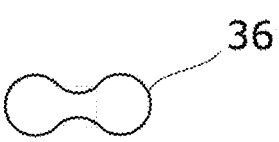
Figure 2F:
Figure 2G:
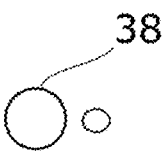

In a further preferred embodiment of the method, the beam-shaping optics 18 generate an asymmetrical beam profile with a preferred lateral direction. FIGS. 2a-2g show various options for a beam profile. FIG. 2a shows an elliptical beam profile 32. This is aligned in such a way that its long semiaxis is aligned along the respective predetermined breaking line. Accordingly, the extent $A_p$ of the beam profile along the predetermined breaking line is greater than the extent $A_s$ perpendicular to the predetermined breaking line. FIG. 2b shows a drop-shaped beam profile 33. In the embodiment of FIG. 2c, the laser beam is divided into two beams. The beam profile 34 accordingly comprises two spaced apart beams in the form of a double beam. FIG. 2d shows a diamond-shaped beam profile 35. FIG. 2e illustrates a dumbbell-shaped beam profile 36, and FIG. 2f a wedge-shaped beam profile 37. Finally, FIG. 2g shows a beam profile 38 comprising a main beam and a weaker or smaller satellite. The embodiments of FIGS. 2b, 2e, 2f, and 2g have in common to not only have a larger dimension in the advancement direction than perpendicular thereto, but also to be asymmetrical with respect to a mirror axis perpendicular to the advancement direction. Such a shape can be very advantageous in order to further facilitate the separation and to achieve higher edge strengths. This is because asymmetrical conditions also exist during the introducing of the filaments, since there are no filaments yet in front of the laser beam as seen in the advancement direction, compared to the part of the predetermined breaking line that the beam has already swept over. More generally, without being limited to the specific examples, it is therefore contemplated that the filamentary defects are introduced by a laser beam 20 that has an asymmetrical beam profile with respect to a reflection perpendicular to the advancement direction.

As a result thereof, a controllable shape with higher geometric accuracy of the predetermined breaking lines 12 of filamentary defects 14 is achieved, paired with higher edge strength once the beads 13 have been severed and the glass sheets 2 have been separated.

In order to promote gap formation in the direction of the predetermined breaking lines, it is favorable for the cross-sectional shape of the laser beam to be chosen so as to have an extension in the direction of the desired break.

The elliptical cross-sectional shape 32 of FIG. 2a may be obtained from an initially circular cross-sectional shape of the laser beam, for example by combined cylindrical lenses. The further beam profiles may also be generated by suitable lenses, optionally also by using diffractive optical elements (DOEs).

In a preferred embodiment of the method for producing glass sheets 2, due to process technology considerations, the order in which the predetermined breaking lines 12 are introduced is first perpendicular to the glass ribbon, thereby producing the transverse predetermined breaking lines 121, and then longitudinally of the glass ribbon on either side thereof, with margins each including a thickened bead, in order to produce the longitudinal predetermined breaking lines 122, because in this case the glass ribbon 4 will still be held together by the beads 13 thereby being mechanically stabilized.

FIG. 3 shows an arrangement for separating the glass ribbon 4 into individual glass sheets 2 and for severing the beads 3.

For this process, advancing means 24 are preferably provided for conveying the continuously drawn glass ribbon 4, which in the illustrated example comprise a conveyor belt 240. In order to be able to introduce the predetermined breaking lines 12 it is possible, more generally, without being limited to the illustrated example, to advantageously use a plurality of ultra-short pulsed lasers 16, and in this case a first ultra-short pulsed laser 16 will introduce the transverse breaking lines 121 and at least one second ultra-short pulsed laser 16 will introduce the longitudinal predetermined breaking lines 122. It is in particular also possible to use two ultra-short pulsed lasers 16 for two longitudinal predetermined breaking lines 122, as in the example shown. The beam-shaping optics 18 of the ultra-short pulsed lasers 16 are not illustrated in the figure, for the sake of simplicity. As in the example shown, the advancing means 24 may furthermore comprise beam deflection optics 241. In this case, the transverse predetermined breaking lines 121 are introduced by a laser beam 20 that is moved over the glass ribbon 4 by beam deflection optics 241, according to one embodiment. Beam deflection optics 241 may comprise a galvanometer scanner, for example.

In a preferred embodiment, as illustrated, the predetermined breaking lines 121, 122 are introduced into the continuous glass ribbon 4 first transversely and then longitudinally.

The severing of individual glass sheets 2 or what is known as a full body cut (FBC) by severing or breaking along the transverse predetermined breaking lines 121 that extend transversely to the glass ribbon 4, may be accomplished using mechanical separating means 28, which, after the laser filamentation, only need to apply particularly low or no separation forces. The beads cut, that is the severing of the beads 13 along the longitudinal predetermined breaking lines 122 of the glass ribbon 4, can be effected by particularly low separating forces, for example by simply pulling and/or by diverting on an acceleration belt 29. An acceleration belt 29 which is used to separate the individual glass sheets 2 in the advancement direction may also form part of the separating means 28, for example, or may represent the separating means 28.

Once the glass sheets 2 have been severed and separated, they can be conveyed to an inspection unit 39 by the advancing means 24. The inspection unit 39 allows to check the dimensions of the glass sheets and their edge quality, inter alia.

In order to achieve good edge quality, it is in particular not necessary to thermally separate the glass ribbon 4 by introducing stresses or by inducing thermal stresses by introducing a temperature differential, for example using a $CO_2$ laser, i.e. it is not necessary for the separation to employ what is known as a thermal cleaving process and thermal shock cutting, for example by abrupt temperature decrease such as a cold shock.

The separation may be accomplished by introducing mechanical tension using spherical rollers, for example, or by directing the predetermined breaking lines over spherical rollers. The beads 13 separated from the rest of the glass ribbon 4 can then be collected, for example in a cullet container, optionally remote from the glass ribbon (in a cullet bunker or other space).

According to the method of the invention, the glass ribbon 4 is annealed with an annealing rate that is chosen as a function of the predefined glass thickness d, and the annealing rate preferably is higher the lower the predefined glass thickness d is, or pregerably the annealing rate is lower the higher the predefined larger glass thickness is.

Figure 4:
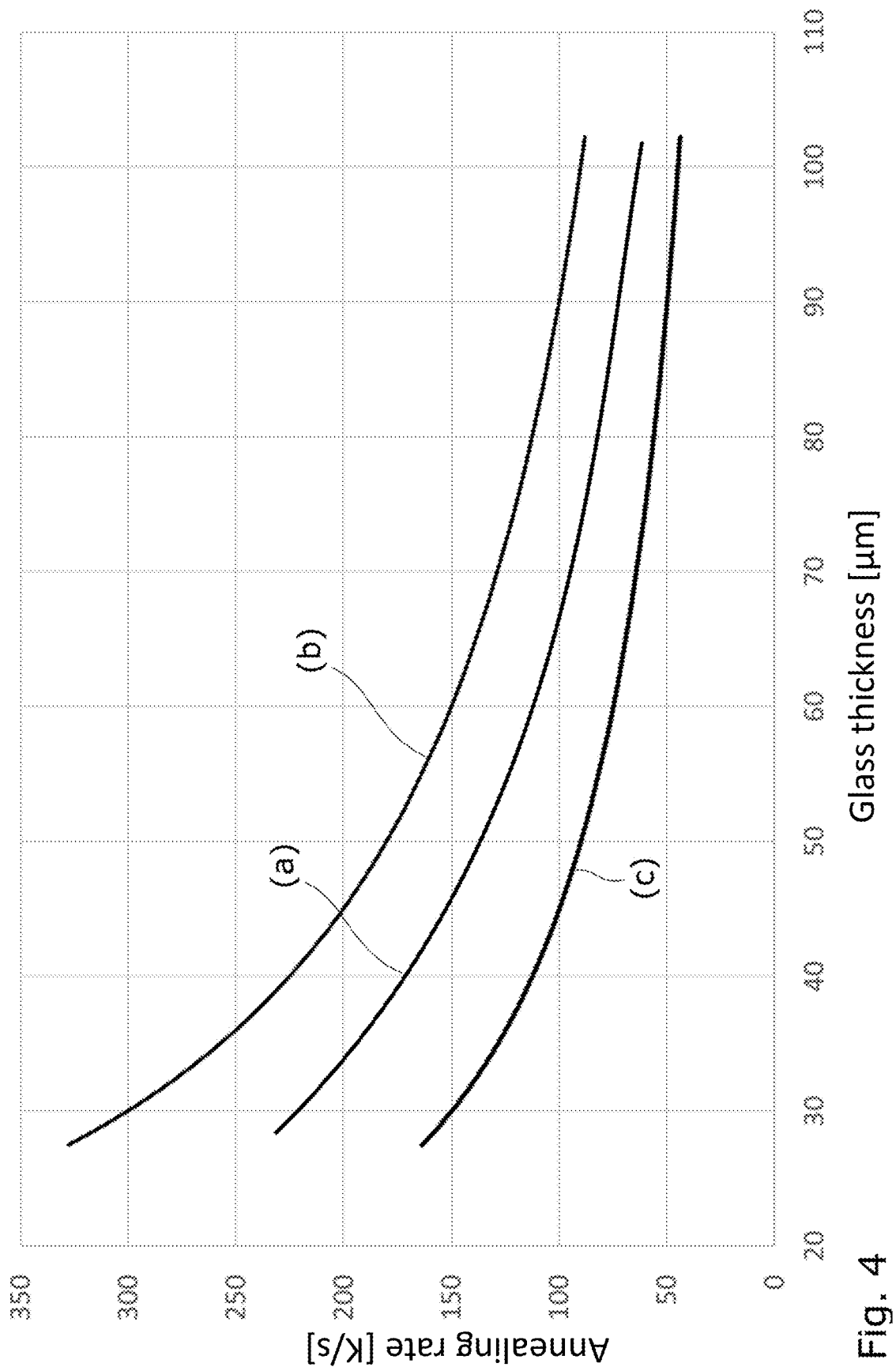
FIG. 4 is a graph of the annealing rate as a function of glass thickness.

FIG. 4 shows a graph of the selected annealing rate as a function of glass thickness. FIG. 4 in particular shows the annealing rate in the range from 40 K/s to 325 K/s as a function of the glass thickness d of the glass ribbon 4, which ranges from 25 µm to 110 µm, by way of the exemplary glass AF32 from Schott AG (curve (a)).

The glass marketed by Schott AG under the designation AF32 is an alkali-free aluminum borosilicate thin glass of a class of alkali-free glasses that is well suited for the method, containing the following components, in wt %:

| | |
|---|---|
| $SiO_2$ | 58 to 65 |
| $B_2O_3$ | 6 to 10.5 |
| $Al_2O_3$ | 14 to 25 |
| MgO | 0 to 3 |
| CaO | 0 to 9 |
| BaO | 3 to 8 |
| ZnO | 0 to 2, | with the total of the contents of MgO, CaO, and BaO ranging from 8 to 18 wt %.

The glass on which the exemplary embodiment is based has the following composition, in wt %:

| | |
|---|---|
| $SiO_2$ | 61 |
| $Al_2O_3$ | 18 |
| $B_2O_3$ | 10 |
| CaO | 5 |
| BaO | 3 |
| MgO | 3. |

The AF32 glass exhibits high optical transmittance, a density ρ of 2430 kg/m³, and a surface tension γ of 0.3 N/m, a thermal conductivity λ of 2 W/mK, and a specific heat capacity $c_p$ of 1360 J/kgK. The transformation temperature $T_g$ of AF32glass is 713° C. AF32 glass has a low coefficient of thermal expansion very close to that of silicon. Furthermore, particularly smooth surfaces with a low roughness of less than 1 nm (RMS) can be produced by the down-drawing process. The application temperature ranges up to approx. 600° C.

Another class of glasses that is suitable for the method presently described contains the following components, in wt %:

| | |
|---|---|
| $SiO_2$ | 50-70 |
| $Al_2O_3$ | 10-20 |
| $B_2O_3$ | 5-15 |
| CaO | 4-8 |
| BaO | 0.5-5 |
| SrO | 4-8. |

In one embodiment, a glass is made using the following components:

| | |
|---|---|
| $SiO_2$ | 60 wt % |
| $B_2O_3$ | 10 wt % |
| $Al_2O_3$ | 15 wt % |
| SrO | 6 wt % |
| CaO | 6 wt % |
| BaO | 2 wt %, | and 1 wt % of further components.

According to a further exemplary embodiment, a glass ribbon is drawn with a thickness of preferably 50 µm±10 µm. A suitable process is an overflow fusion process, for example.

Another class of glasses that are well suited for the invention, since they can be processed into thin glass ribbons and are easily divided by introducing predetermined breaking lines as presently described, has the following components, in wt %:

| | |
|---|---|
| $SiO_2$ | 30 to 85 |
| $B_2O_3$ | 3 to 20 |
| $Al_2O_3$ | 0 to 15 |
| $Na_2O$ | 3 to 15 |
| $K_2O$ | 3 to 15 |
| ZnO | 0 to 12 |
| $TiO_2$ | 0.5 to 10 |
| CaO | 0 to 0.1. |

One example from this class of glasses has the following composition, in wt %:

| | |
|---|---|
| $SiO_2$ | 64.0 |
| $B_2O_3$ | 8.3 |
| $Al_2O_3$ | 4.0 |
| $Na_2O$ | 6.5 |
| $K_2O$ | 7.0 |
| ZnO | 5.5 |
| $TiO_2$ | 4.0 |
| $Sb_2O_3$ | 0.6 |
| Cl | 0.1 |

Glass sheets of this composition generally have the following characteristics:

| | |
|---|---|
| (20-300) | $7.2 \cdot 10^{-6}$/K |
| Tg | 557° C. |
| Density | 2.5 g/cm³. |

Another class of glasses which can be chemically toughened and which are particularly suitable for being processed by the method presently described contains the following components, in wt %:

| | |
|---|---|
| $SiO_2$ | 50 to 65 |
| $Al_2O_3$ | 15 to 20 |
| $B_2O_3$ | 0 to 6 |
| $Li_2O$ | 0 to 6 |
| $Na_2O$ | 8 to 15 |
| $K_2O$ | 0 to 5 |
| MgO | 0 to 5 |
| CaO | 0 to 7, preferably 0 to 1 |
| ZnO | 0 to 4, preferably 0 to 1 |
| $ZrO_2$ | 0 to 4 |
| $TiO_2$ | 0 to 1, preferably substantially free of $TiO_2$. |

The glass may furthermore contain 0 to 1 wt % of $P_2O_5$, SrO, BaO, and 0 to 1 wt % of refining agents: $SnO_2$, $CeO_2$, or $As_2O_3$, or other refining agents.

According to one embodiment, a glass with a composition from the above range is used to produce glass sheets having one of the following thicknesses: 35 µm±5 µm, 50 µm±5 µm, 75 m±5 µm, 100 µm±10 µm. The glasses of the aforementioned class can be drawn into thin glass ribbons using both a down-drawing process or an overflow fusion process, and such glass ribbons can be easily separated into glass sheets by introducing predetermined breaking lines using the method described herein, while achieving high strengths. Optionally, the desired glass thickness may else be achieved by thinning, chemically or mechanically, if this is not possible or difficult in the drawing process.

One example from this class of glasses has the following composition, in wt %:

| | |
|---|---|
| $SiO_2$ | 60.7 |
| $Al_2O_3$ | 16.9 |
| $Na_2O$ | 12.2 |
| $K_2O$ | 4.1 |
| MgO | 3.9 |
| $ZrO_2$ | 1.5 |
| $SnO_2$ | 0.4 |
| $CeO_2$ | 0.3. |

All of the glasses mentioned here can be easily processed by down-drawing into glass ribbons with a thickness ranging from 30 to 100 µm.

Without being limited to the illustrated example, the method according to the invention preferably comprises annealing a glass ribbon 4 of a predefined glass thickness d in the range from m to 2 mm at an annealing rate of equal to or greater than (40 K/s because of FIG. 4) 50 K/s, preferably equal to or greater than 100 Kelvin/s, most preferably equal to or greater than 150 Kelvin/s, or of equal to or greater than 200 Kelvin/s.

As shown by the graph of FIG. 4, for a glass ribbon of 30 µm in thickness, an annealing rate is preferably chosen in the range between 150 K/s and 300 K/s, and for a glass ribbon of 50 µm in thickness, an annealing rate is preferably chosen in the range between 90 K/s and 180 K/s, and for a glass ribbon of 100 µm in thickness, an annealing rate is preferably chosen in the range between 45 K/s and 90 K/s.

Thus, without being limited to the illustrated example or the glass compositions described herein, the glass ribbon is preferably annealed at an annealing rate ranging between 150 K/s·30 µm/d and 300 K/s·30 µm/d, where d is the thickness of the glass ribbon. Curve (b) in FIG. 4 indicates the upper limit of (1/d)·300 K/s·30 μm, curve (c) the lower limit of (1/d)·150 K/s·30 μm.

This preferred range can alternatively be expressed as follows: the glass ribbon is preferably annealed at an annealing rate which ranges from (1/d)·4500 Kelvin·μm/s (curve (c)) to (1/d)·9000 Kelvin·μm/s (curve (b)), where d is the thickness of the glass ribbon.

Figure 5:
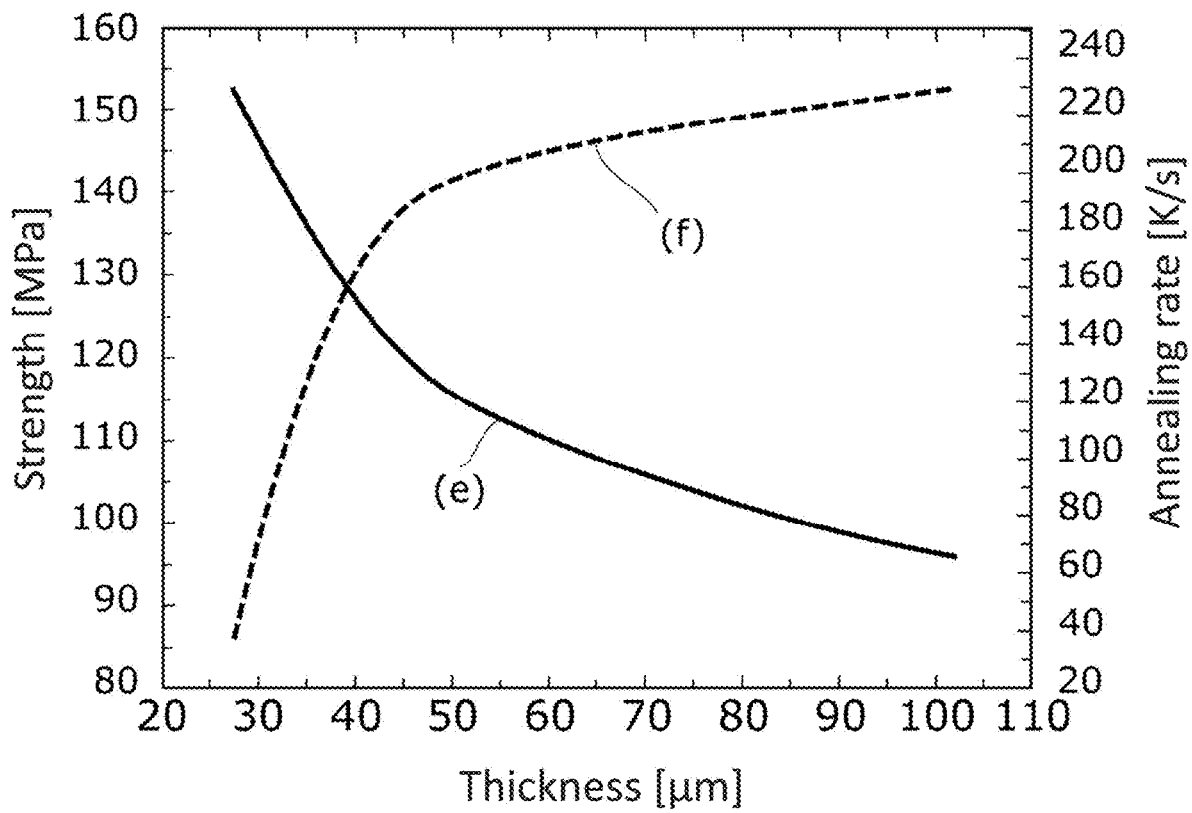
FIG. 5 is a graph of edge strength and annealing rate as a function of glass thickness.
Figure 6:
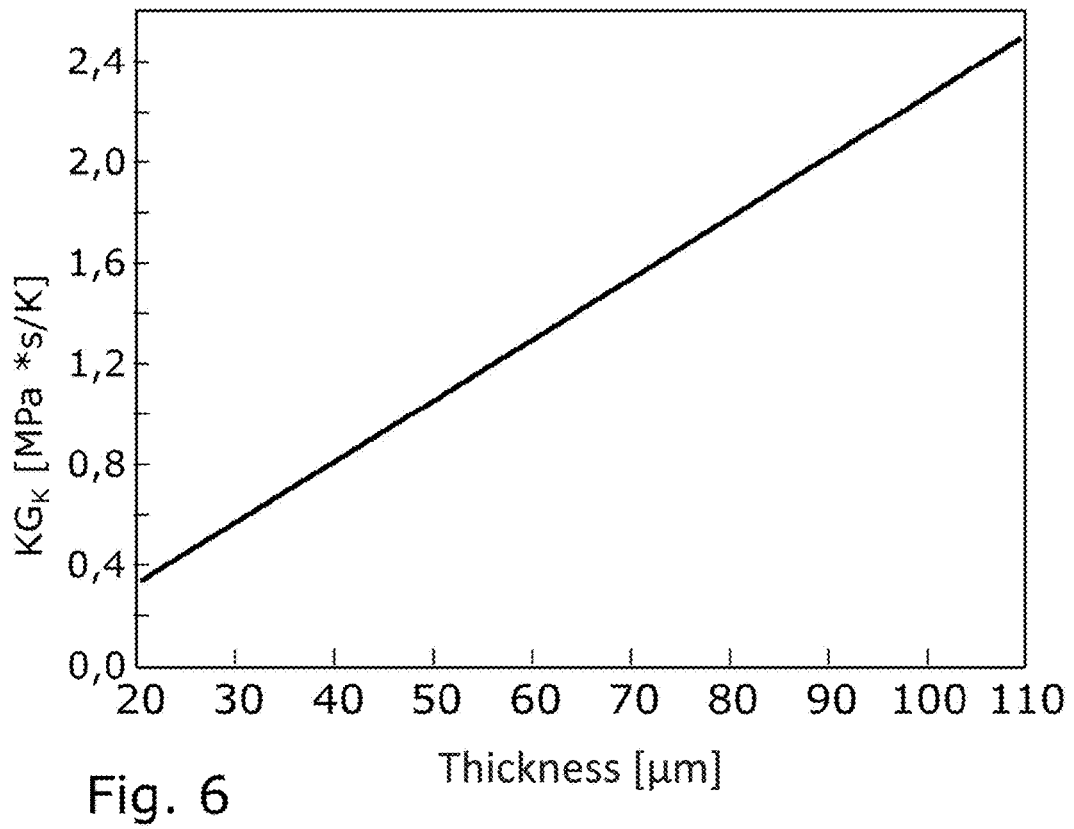
FIG. 6 is a graph of a coefficient of the annealing rate-dependent edge strength as a function of glass thickness.

The method according to the invention surprisingly allows to achieve glass sheets with high edge strengths, even at high annealing rates, when taking into account the glass thickness, as shown in FIGS. 5 and 6 byway of example.

FIG. 5 is a graph of edge strength and annealing rate as a function of glass thickness, and FIG. 6 shows a graph of a coefficient of the annealing rate-dependent edge strength as a function of glass thickness. FIG. 5 shows a graph of edge strength in the range from 85 MPa to 155 MPa (curve (f) and annealing rate (curve (e)) in the range from 40 to 230 Kelvin/s as a function of glass thickness in the range from 20 μm to 110 μm for the exemplary glass AF32 from Schott AG. As can be seen from FIG. 5, with a glass thickness of 30 μm and an annealing rate of 150 Kelvin/s, edge strength is approx. 90 MPa; with a glass thickness of 50 μm and an annealing rate of 120 Kelvin/s, edge strength is approx. 140 MPa; and with a glass thickness of 100 μm and an annealing rate of 70 Kelvin/s, edge strength is approx. 155 MPa. All edge strengths are sufficient for use applications of the glasses. This is especially true because, although thinner glasses exhibit lower edge strengths, they however exhibit very high flexibility due to their small thickness. Due to the small thickness, the stresses arising at the edge when the glass is bent are low.

This relationship can be described by the "annealing-dependent edge strength" coefficient ($KG_K$) in MPa*K/s: $KG_K = KG/K$, wherein KG is the edge strength in MPa, and K is the annealing rate in K/s.

FIG. 6 shows a graph of the annealing rate-dependent edge strength coefficients in the range from 0.3 to 2.5 MPa*s/K as a function of glass thickness in the range from 20 μm to 110 μm for the example of AF32 glass from Schott AG. It turns out that with the separation method disclosed herein, the coefficient of edge strength to annealing rate generally exhibits a linear relationship to layer thickness, without being limited to the illustrated example.

In the example for the AF32 glass, the values in FIG. 6 give the relationship $$KG_K = KG/K, (KG_K = -0.16974 + 0.02434*d),$$

where d is the thickness of the glass in micrometers.

For a glass thickness of at least 30 μm, the annealing-dependent edge strength $KG_K$ is preferably greater than 0.2 MPa·s/Kelvin, more preferably greater than 0.5 MPa·s/Kelvin. When converting the above relationship into $KG = K*KG_K$, the edge strengths KG resulting for a glass thickness of at least 30 μm are: an edge strength (KG) of 90 MPa for an annealing rate (K) of 150 MPa·s/K with the annealing-dependent edge strength coefficient ($KG_K$) of 0.6 MPa·s/K; an edge strength (KG) of 30 MPa for an annealing rate (K) of 150 MPa*s/K with the annealing rate-dependent edge strength coefficient ($KG_K$) of 0.2 MPa·s/K; and an edge strength (KG) of 150 MPa for an annealing rate (K) of 300 MPa·s/K with the annealing rate-dependent edge strength coefficient ($KG_K$) of 0.5 MPa·s/K.

For a glass thickness of at least 50 μm, the annealing-dependent edge strength $KG_K$ is preferably greater than 0.5 MPa·s/Kelvin, more preferably greater than 0.9 MPa·s/Kelvin. Thus, for a glass thickness of at least 50 μm, an edge strength (KG) of 45 MPa is resulting for an annealing rate (K) of 90 MPa·s/K with the annealing rate-dependent edge strength coefficient ($KG_K$) of 0.5 MPa·s/K; and an edge strength (KG) of 162 MPa is resulting for an annealing rate (K) of 180 MPa·s/K with the annealing rate-dependent edge strength coefficient ($KG_K$) of 0.9 MPa·s/K.

For a glass thickness of at least 100 μm, the annealing-dependent edge strength $KG_K$ is preferably greater than 1.5 MPa·s/Kelvin, more preferably greater than 2 MPa·s/Kelvin. Thus, for a glass thickness of at least 100 μm, an edge strength (KG) of 67.5 MPa is resulting for an annealing rate (K) of 45 MPa·s/K with the annealing rate-dependent edge strength coefficient ($KG_K$) of 1.5 MPa·s/K; and an edge strength (KG) of 180 MPa for an annealing rate (K) of 90 MPa·s/K with the annealing rate-dependent edge strength coefficient ($KG_K$) of 2 MPa·s/K.

Thus, for given glass thicknesses, specific/predefined edge strengths of the glass sheets can be selectively achieved by choosing the annealing rate.

The method of the invention permits to produce glass sheets with a glass thickness of 15 μm to 2 mm, preferably with a glass thickness of equal to or less than 100 μm, 50 μm, or 30 μm, also with a thermal expansion coefficient of greater than 6 ppm/Kelvin, and the glass sheet preferably has a Weibull modulus (according to DIN EN 843-5) of more than 7, in particular of more than 8, and an edge strength or characteristic stress at break of more than 150 MPa, preferably of more than 180 MPa.

TABLE

| Designation | Characteristic stress at break [MPa] | Weibull modulus (acc. to DIN EN 843-5) |
|---|---|---|
| AF32_30 μm | 150-250 | ≥7 |
| AF32_50 μm | 150-250 | |
| Set 1-AF32_100 μm | 150-250 | |

The table shows the characteristic breaking stresses and Weibull moduli of the strength distributions for the laser-cut AF32 glass from Schott for the different glass thicknesses of 30 μm, 50 μm, and 100 μm, which is manufactured using a down-drawing process.

The higher the Weibull modulus, the more homogeneous and less prone to failure is the workpiece, i.e. the glass sheet in the present case. The high Weibull modulus is a special characteristic of the glass sheets 2 produced by the method disclosed herein.

Figure 7:
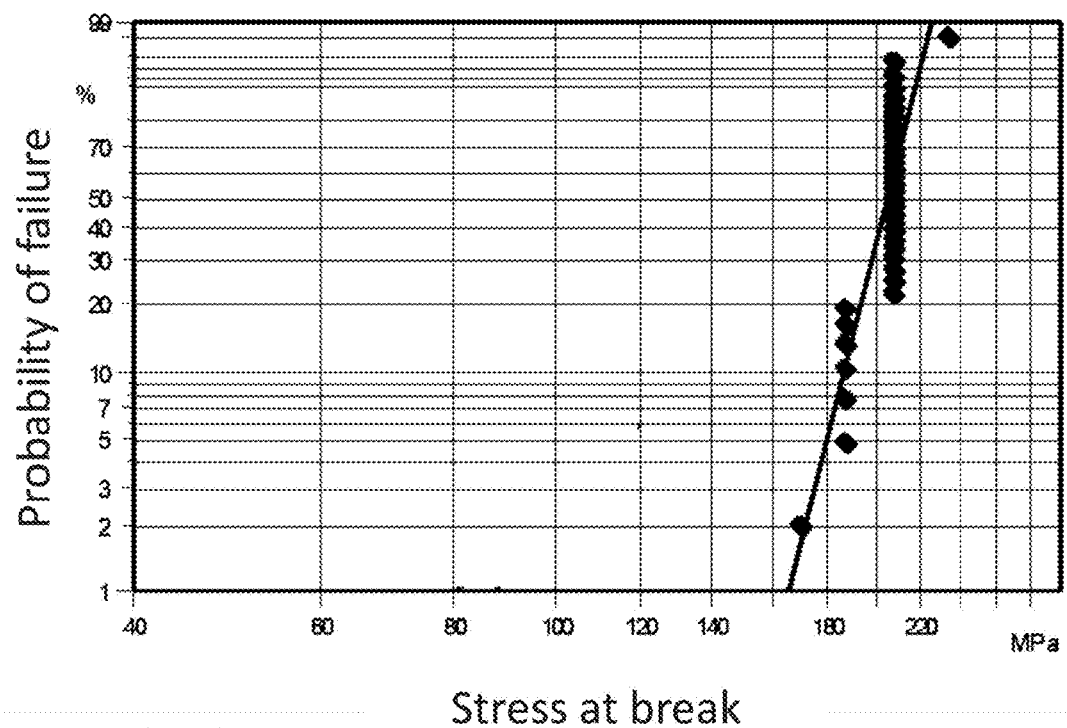
FIGS. 7 and 8 show Weibull graphs of failure probability as a function of stress at break.
Figure 8:
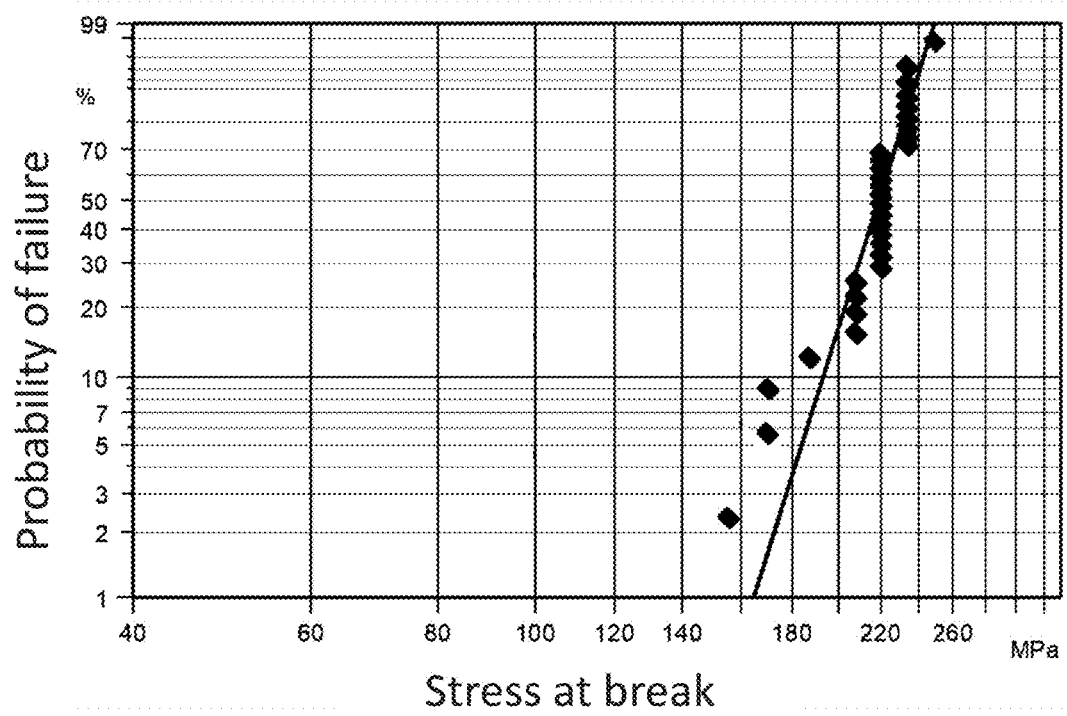

FIGS. 7 and 8 show exemplary Weibull graphs of failure probability as a function of stress at break. The graph of FIG. 7 shows the measured values from which the data for table entry "AF32_50 μm" were obtained. Accordingly, glass sheets were tested which were made of AF32 glass and had a thickness of 50 μm. FIG. 8 shows the measured values for table entry "Set 1—AF32_100 m". Accordingly, AF-32 glass sheets with a thickness of 100 μm were tested for this purpose.

Figure 9:
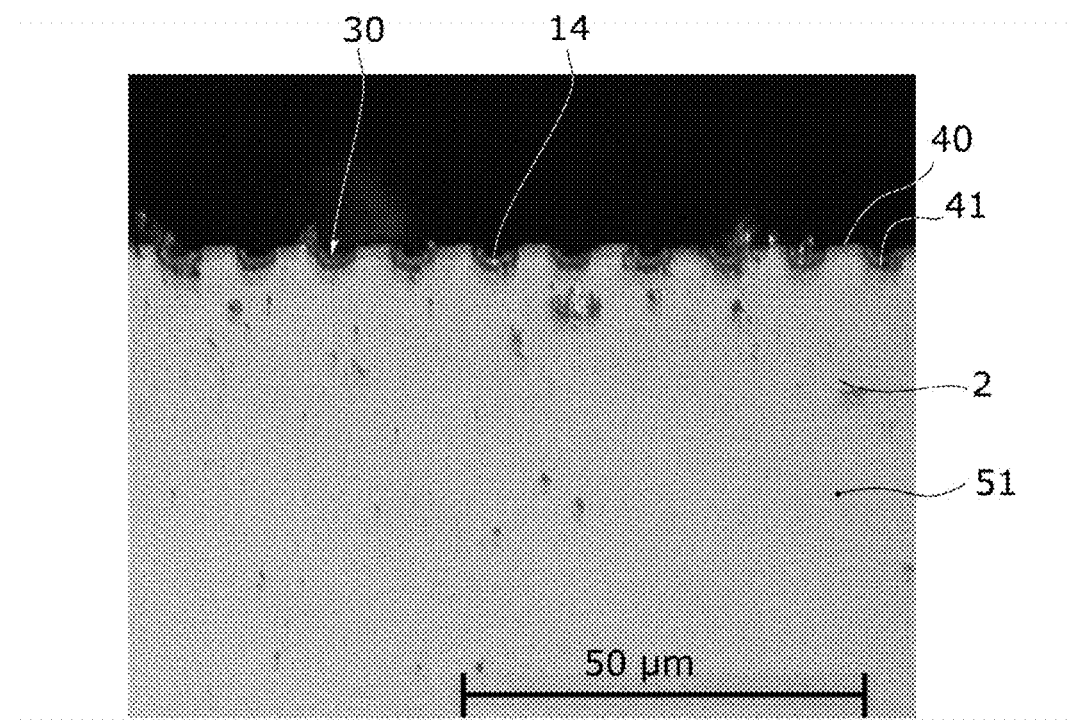
FIG. 9 shows a micrograph of the edge region of a glass sheet.

The glass sheets produced by the method of the invention typically have rough surface areas which are produced by the separation along the filamentary defects, and essentially flat surface areas therebetween. The area ratio of the flat surface areas to the rough surface areas is generally between 3:10 and 2:1. An example of this is shown by the micrograph of FIG. 9 of a face 51 of glass sheet 2 that is delimited by an edge 30 which was produced with the method according to the present disclosure by introducing a predetermined breaking line consisting of adjacent spaced-apart filamentary defects 14 and then severing the glass ribbon along the predetermined breaking line. The filamentary defects 14 can still be seen at the edge 30 as half-open channels. These channels form rough surface areas 41 on the edge 30. Flat surface areas 40 extend between these rough surface areas.

Figure 10:
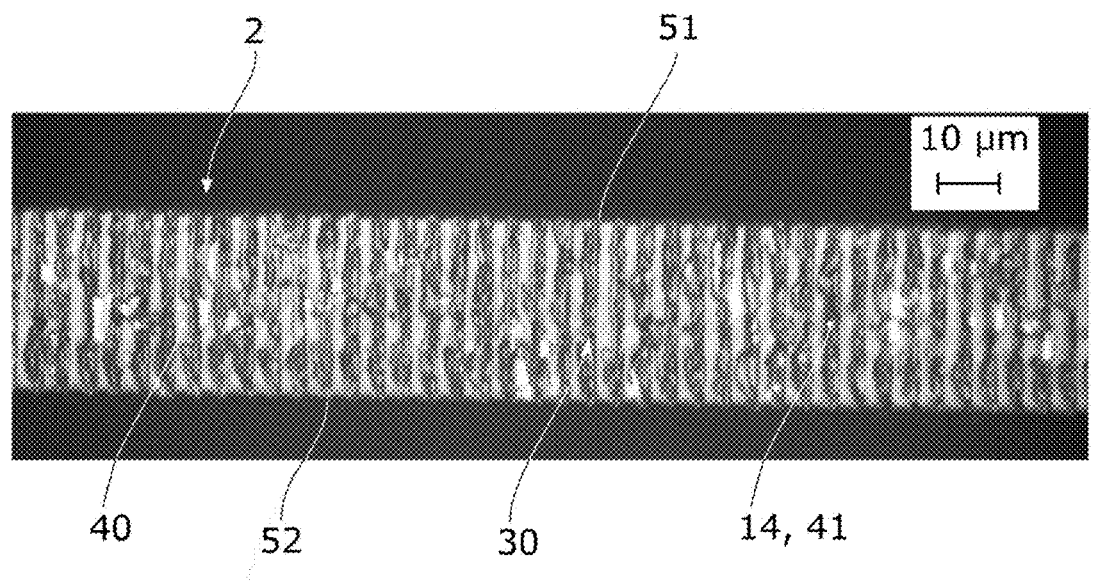
FIG. 10 shows a micrograph of the edge of a glass sheet.

The texture of edges 30 can also be seen in the example of FIG. 10. FIG. 10 shows a micrograph of the surface area of the edge 30 of a glass sheet 2 with a thickness of 30 μm. What can be clearly seen here is the periodic pattern of the filamentary defects 14 that extend from one face 51 to the opposite face 52 and which form rough surface areas between which comparatively flatter surface areas 40 extend.

Figure 11:
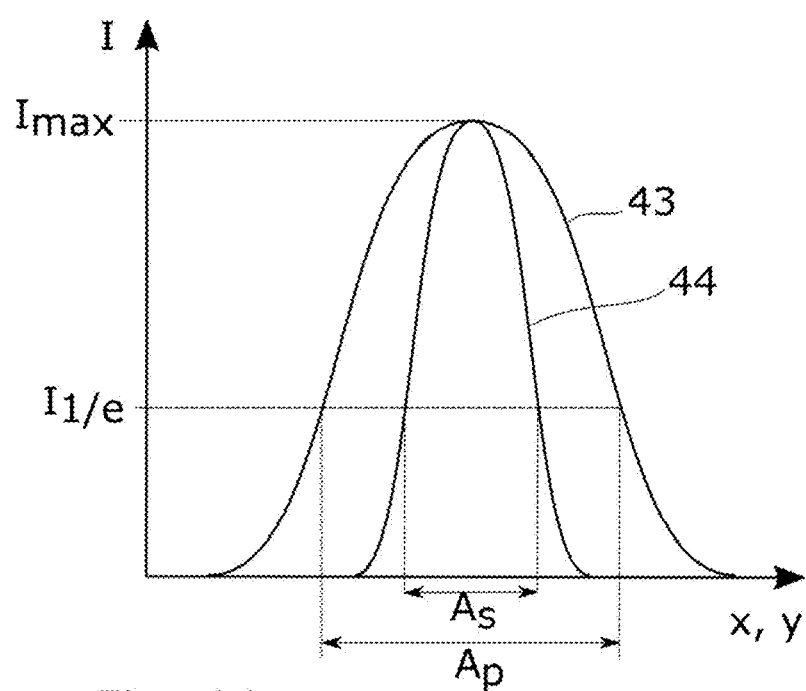
FIG. 11 shows a schematic diagram of an intensity profile.

As already discussed above, particularly strong edges 30 with a high Weibull modulus can be obtained by adjusting the beam profile such that the light intensity of the laser beam 20 is greater in the direction along the predetermined breaking line 12 than perpendicular thereto. This is achieved by a beam profile that has a larger dimension in the direction along the predetermined breaking line than perpendicular thereto. The dimensions $A_s$ perpendicular to the predetermined breaking line and $A_p$ parallel to the predetermined breaking line are indicated in the example of FIG. 2a. In this respect, FIG. 11 furthermore shows a schematic diagram of the intensity profile 43 of the focus area 22 along the predetermined breaking line and of the intensity profile 44 of the focus area 22 perpendicular to the predetermined breaking line. The dimensions $A_S$ and $A_p$ can be considered as the ranges within which the light intensity has dropped from its maximum value $I_{max}$, to a value reduced by a factor of 1/e, $I_{1/e}$. As shown, $A_s$ is smaller than $A_p$. More generally, without being limited to the examples shown, it is contemplated according to a preferred embodiment that the laser beam 20 is shaped by appropriate beam-shaping optics 18 in such a way that in the focal area 22 the dimension $A_p$ of the laser beam 20 in the direction along the predetermined breaking line or in the direction along the direction of movement of the laser beam 20 over the glass ribbon 4 as imparted by the advancing means is greater than the dimension $A_s$ in the direction perpendicular to the predetermined breaking line by a factor ranging from 1.3 to 5, preferably by a factor ranging from 1.5 to 4. If the beam profile is deformed excessively, the light intensity distribution might become too large, which counteracts an effective formation of filamentary defects in the glass.

It will be apparent to a person skilled in the art that the disclosure is not limited to the specific exemplary embodiments illustrated in the figures, but can rather be varied in various ways within the scope of the features of the claims. In addition to examples (b), (f), and (g), many other non-mirror-symmetrical shapes of beam profiles are conceivable, in particular which have an asymmetrical beam profile with respect to a reflection perpendicular to the advancement direction. For example, the movement of the laser beam 20 for introducing the transverse predetermined breaking lines may also be accomplished otherwise than shown in FIG. 3, by mechanical movement of the optics, in particular by moving the entire ultra-short pulsed laser 16 together with the beam-shaping optics over the glass ribbon 4. For this purpose, the laser may be moved over a traverse using a carriage, for example, or the beam may be directed onto the glass ribbon at different transverse positions by a moving reflective deflecting prism or mirror.

LIST OF REFERENCE SYMBOLS

| | | | |
|---|---|---|---|
| 1 | Apparatus | 32-38 | Beam profiles |
| 2 | Glass sheets | 39 | Inspection unit |
| 4 | Glass ribbon | 40 | Flat area |
| 6 | Slot-shaped nozzle | 41 | Rough area |
| 8 | Hot forming means | 43 | Intensity profile |
| 10 | Molten glass | 44 | Intensity profile |
| 12 | Breaking line(s) | 51, 52 | Faces of glass ribbon |
| 121 | Transverse breaking line(s) | 240 | Conveyor belt |
| 122 | Longitudinal breaking line(s) | 241 | Deflection optics |
| 13 | Bead | d | Glass thickness |
| 14 | Filamentary defects(s) | | |
| 15 | Pressure roller | | |
| 16 | Ultra-short pulsed laser | | |
| 18 | Beam-shaping optics | | |
| 20 | Laser beam | | |
| 22 | Focus area | | |
| 24 | Advancing means | | |
| 26 | Annealing means | | |
| 27 | Lehr | | |
| 28 | Separating means | | |
| 29 | Acceleration belt | | |
| 30 | Edges | | |

What is claimed is:

1. A method for producing glass sheets, comprising the steps of:
   hot forming a continuous glass ribbon from a molten glass to a glass thickness in a range from 15 μm to 2 mm between a first face and a second face;
   annealing the continuous glass ribbon at an annealing rate based on the glass thickness;
   generating a laser beam using an ultra-short pulsed laser;
   producing a focus area of the laser beam using beam-shaping optics such that the focus area is longer than the glass thickness;
   causing the laser beam to introduce breaking lines consisting of filamentary defects into the glass ribbon so that the filamentary defects extend from the first face to the second face, the filamentary defects being spaced apart from one another to define transverse breaking lines perpendicular to the glass ribbon and longitudinal breaking lines along a longitudinal direction of the glass ribbon, the longitudinal breaking lines being on sides of the glass ribbon with margins each comprising a thickened bead;
   separating along the longitudinal breaking lines to remove the thickened beads thereby forming longitudinal edges of the glass sheet; and
   separating along the transverse breaking lines thereby forming transverse edges of the glass sheet, wherein the annealing rate is equal to or greater than 40 Kelvin/s such that the glass sheet, after the separating step, comprises a Weibull modulus according to DIN EN 843-5 of more than 7 and/or a characteristic stress at break of more than 130 MPa.

2. The method of claim 1, wherein the annealing rate ranges from (1/d)·4500 Kelvin/(s·μm) to (1/d)·9000 Kelvin/(s·μm), wherein d is the glass thickness.

3. A method for producing glass sheets, comprising the steps of:
   hot forming a continuous glass ribbon from a molten glass to a glass thickness in a range from 15 μm to 2 mm between a first face and a second face:
   annealing the continuous glass ribbon at an annealing rate based on the glass thickness:
   generating a laser beam using an ultra-short pulsed laser:

producing a focus area of the laser beam using beam-shaping optics such that the focus area is longer than the glass thickness;

causing the laser beam to introduce breaking lines consisting of filamentary defects into the glass ribbon so that the filamentary defects extend from the first face to the second face, the filamentary defects being spaced apart from one another to define transverse breaking lines perpendicular to the glass ribbon and longitudinal breaking lines along a longitudinal direction of the glass ribbon, the longitudinal breaking lines being on sides of the glass ribbon with margins each comprising a thickened bead;

separating along the longitudinal breaking lines to remove the thickened beads thereby forming longitudinal edges of the glass sheet; and separating along the transverse breaking lines thereby forming transverse edges of the glass sheet, wherein the annealing rate is equal to or greater than 40 Kelvin/s such that the glass sheet, after the separating step, comprises a Weibull modulus according to DIN EN 843-5 of more than 7 and/or a characteristic stress at break of more than 130 MPa, and wherein the step of annealing is performed prior to the step of causing the laser beam to introduce the filamentary defects.

4. The method of claim 1, wherein the annealing step is performed at a temperature below a softening point of the glass ribbon.

5. The method of claim 1, wherein the annealing step comprises using heating elements in a lehr.

6. The method of claim 1, further comprising shaping a beam profile of the laser beam so that a dimension of the laser beam is greater in a direction of the breaking lines than perpendicular to the breaking lines.

7. The method of claim 1, wherein the step of producing the focus area of the laser beam using the beam-shaping optics comprises producing a beam profile selected from a group consisting of an elliptical beam profile, a drop-shaped beam profile, a double beam profile, a diamond-shaped beam profile, a dumbbell-shaped beam profile, a wedge-shaped beam profile, and a beam profile comprising a main beam and a satellite of lower intensity or dimension.

8. The method of claim 1, wherein the step of producing the focus area comprises generating the focus area with a dimension in a direction along the breaking lines that is greater than a dimension in a direction perpendicular to the breaking lines by a factor in a range from 1.3 to 5.

9. The method of claim 1, wherein the laser beam has an asymmetrical beam profile with respect to a reflection perpendicular to an advancement direction.

10. The method of claim 1, wherein the filamentary defects are spaced apart from one another by a spacing that is not larger than the glass thickness.

11. The method of claim 10, wherein the spacing is in a range from 1 µm to 10 µm.

12. The method of claim 10, wherein the glass thickness from 15 µm to less than 100 µm.

13. The method of claim 1, wherein the step of causing the laser beam to introduce the breaking lines comprises introducing the transverse breaking lines before introducing the longitudinal breaking lines.

14. The method of claim 1, wherein the first and second edges exhibit an annealing-dependent edge strength ($KG_K$) which satisfies $KG_K = KG/K$, wherein KG denotes a strength value in MPa, and K denotes the annealing rate in Kelvin/s, and wherein the annealing-dependent edge strength $KG_K$ is selected from a group consisting of: greater than 0.2 MPa·s/Kelvin for the glass thickness of at least 30 µm; greater than 0.5 MPa·s/Kelvin for the glass thickness of at least 30 µm; greater than 0.5 MPa·s/Kelvin for the glass thickness of at least 50 µm; greater than 0.9 MPa·s/Kelvin for the glass thickness of at least 50 µm; greater than 1.5 MPa·s/Kelvin for the glass thickness of at least 100 µm; greater than 2 MPa·s/Kelvin for the glass thickness of at least 100 µm; and any combinations thereof.

15. The method of claim 1, wherein the steps of separating along the longitudinal and/or transvers breaking lines comprise mechanical separation.

16. The method of claim 1, wherein the glass sheet comprises a coefficient of thermal expansion of greater than 6 ppm/Kelvin.

17. The method of claim 1, further comprising configuring the glass sheet for a use selected from a group consisting of an insulating intermediate substrate, a spacer for an electronic component, an encapsulating optoelectronic component, a substrate for a thin-film cell, a substrate for a thin-film batteries, a substrate for a thin-film solar cell, a composite substrates for a display, and a microfluidic cell.

* * * * *